(12) United States Patent
Hao

(10) Patent No.: US 6,176,110 B1
(45) Date of Patent: Jan. 23, 2001

(54) VEHICLE STEERING WHEEL LOCKING DEVICE

(75) Inventor: Wu Hao, Zehjiang (CN)

(73) Assignee: Howard Berger Co., Inc., Brooklyn, NY (US)

(*) Notice: Under 35 U.S.C. 154(b), the term of this patent shall be extended for 0 days.

(21) Appl. No.: 09/322,251

(22) Filed: May 28, 1999

(51) Int. Cl.$^7$ .................................................. B60R 25/02
(52) U.S. Cl. ................................................. 70/209; 70/226
(58) Field of Search ............................ 70/19, 226, 209, 70/211, 212, 225, 236, 237

(56) References Cited

U.S. PATENT DOCUMENTS

| | | | |
|---|---|---|---|
| 5,055,823 | * 10/1991 | Fuller ...................................... | 70/209 |
| 5,129,245 | * 7/1992 | Chang ...................................... | 70/209 |
| 5,144,822 | 9/1992 | Jan et al. ................................. | 70/209 |
| 5,165,264 | 11/1992 | Chen ....................................... | 70/209 |
| 5,168,732 | 12/1992 | Chen et al. ............................. | 70/209 |
| 5,199,284 | * 4/1993 | Lin ......................................... | 70/209 |
| 5,230,232 | * 7/1993 | Yang ....................................... | 70/209 |
| 5,678,433 | * 10/1997 | Riccitelli ................................ | 70/209 |
| 5,921,120 | * 7/1999 | Wu ......................................... | 70/209 |

\* cited by examiner

*Primary Examiner*—Darnell M. Boucher
(74) *Attorney, Agent, or Firm*—Kramer Levin Naftalis & Frankel LLP

(57) ABSTRACT

An apparatus for locking steering wheels is provided which comprises a body member, an entrapping member and a locking system. The body member has a recess therein which is configured to receive therein a portion of the steering wheel. The entrapping member is movably supported on the body member, and is moveable between a locked position in which the entrapping member retains the portion of the steering wheel in the recess, and a release position in which the steering wheel can be withdrawn from the recess. The locking system is operatively associated with the entrapping member, and selectively secures the entrapping member in the locked position so that the locking apparatus cannot be removed from the steering wheel or releases the entrapping member to move to the release position, so the locking device can be removed from the steering wheel.

8 Claims, 4 Drawing Sheets

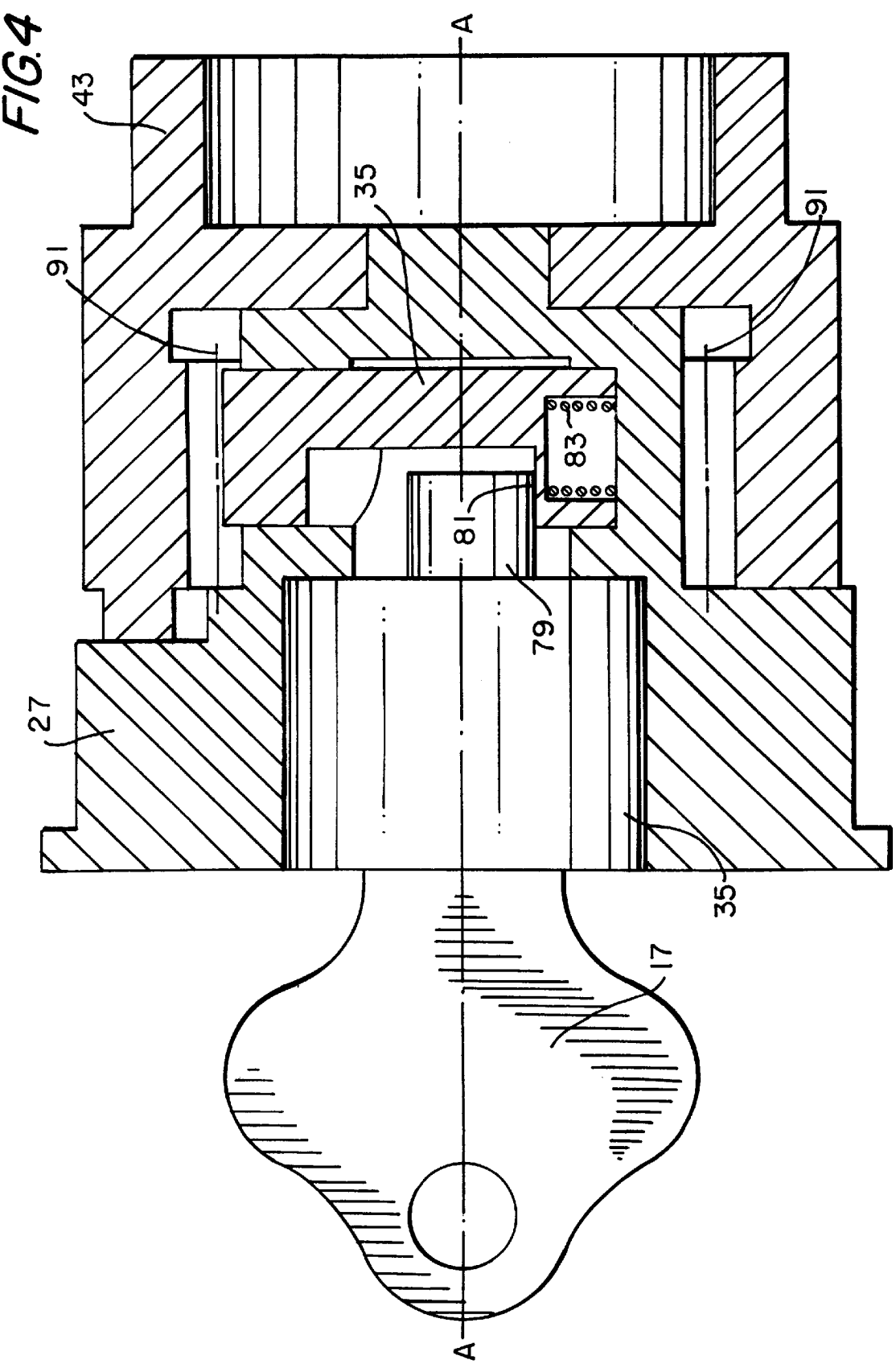

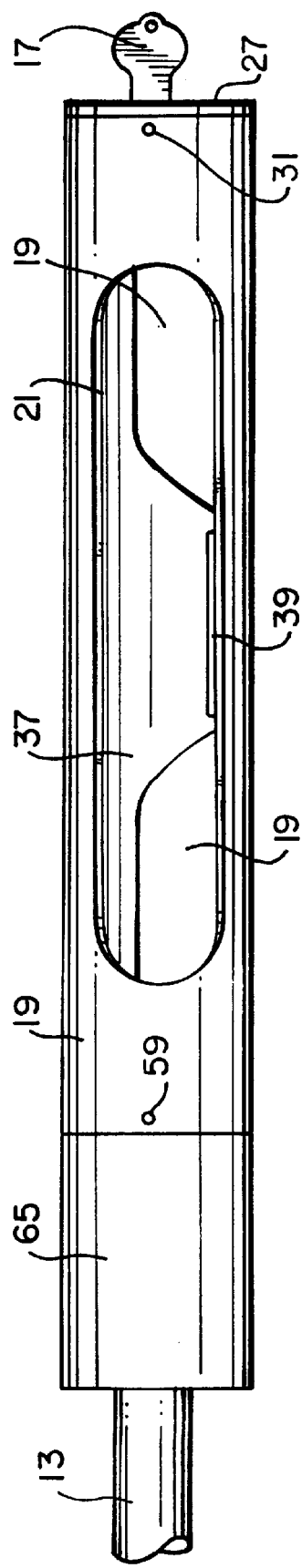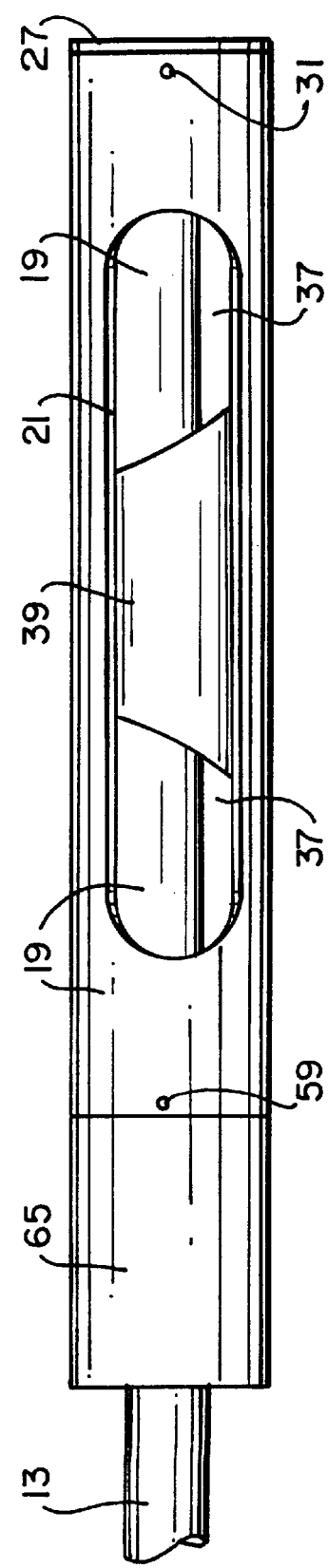

VEHICLE STEERING WHEEL LOCKING DEVICE

FIELD OF THE INVENTION

This invention relates to security devices for locking vehicles to prevent theft, and more particularly to devices that lock the steering wheel of the vehicle to prevent unauthorized persons driving it.

DESCRIPTION OF THE PRIOR ART

A number of devices have been designed in the prior art which are directed to locking the steering wheel of a vehicle so that the vehicle cannot be easily driven while the apparatus is locked to the steering wheel.

One problem with making such devices is that when they are not in use, they are somewhat inconvenient to store, as they have various hook structures or other oddly shaped extensions which take up space.

Also, steering wheels of varying designs may not accommodate all types of locking devices, as where there is no clearance for inserting the locking device on the particular steering wheel design.

In addition, devices that locked in the steering wheel may provide for accessibility for a potential thief for removing the device due to limited contact with the steering wheel.

SUMMARY OF THE INVENTION

The present invention provides a steering wheel lock for vehicles which overcomes these drawbacks of the prior art.

To achieve this, an apparatus for locking steering wheels is provided which comprises a body member, an entrapping member and a locking system. The body member has a recess therein which is configured to receive therein a portion of the steering wheel. The entrapping member is movably supported on the body member, and is moveable between a locked position in which the entrapping member retains the portion of the steering wheel in the recess, and a release position in which the steering wheel can be withdrawn from the recess. The locking system is operatively associated with the entrapping member, and selectively secures the entrapping member in the locked position so that the locking apparatus cannot be removed from the steering wheel. The locking system also serves so as to release the entrapping member to move to the release position, so the apparatus can be removed from the steering wheel, and the vehicle can be driven.

It is also an object of the invention that the locking system preferably allows movement of the entrapping member into the locking position when the locking system is in the locked condition. The locking system preferably comprises a key lock structure, and the entrapping member can preferably be moved into at least one intermediate position between the locked and release positions. The locking system latch structure includes a ratchet which permits the entrapping member to incrementally move into the intermediate position from the release position. The reverse movement, however, is not possible while the system in the locked condition.

Most preferably the body member is a hollow cylindrical structure, and the recess is defined as a longitudinal opening in the wall of the cylinder. The entrapping member is moveable between the locked and release positions by rotation about the same axis as the cylinder.

It is also an object to further aid in the difficulty of turning the wheel when the locking device is locked thereto. The device preferably includes an extension arm which projects from the body away from wheel. The extension arm preferably is slidable in and out of the body and when locked to the wheel the presence of the wheel and the recess blocked the sliding of the arm. This allows for the storage of the extension arm of the member when the device is not in use.

The entrapping member in the locked position preferably extends across the recess in the body member so that there is an opening communicating with the recesses on either side of the entrapping member. The steering wheel extends through these openings when the apparatus is locked into it.

Other objects and advantages of the invention will become apparent in the foregoing specification, and the scope of the invention will be articulated in the claims.

BRIEF DESCRIPTION OF THE DRAWINGS

FIG. 4 shows an enlarged sectional view taken through the centerline of the apparatus showing the key lock structure of the device.

FIG. 5 is a side view of the locking device of the invention in the release condition.

FIG. 6 is a side view of the locking device in a locked condition.

DETAILED DISCLOSURE

Figure 1:
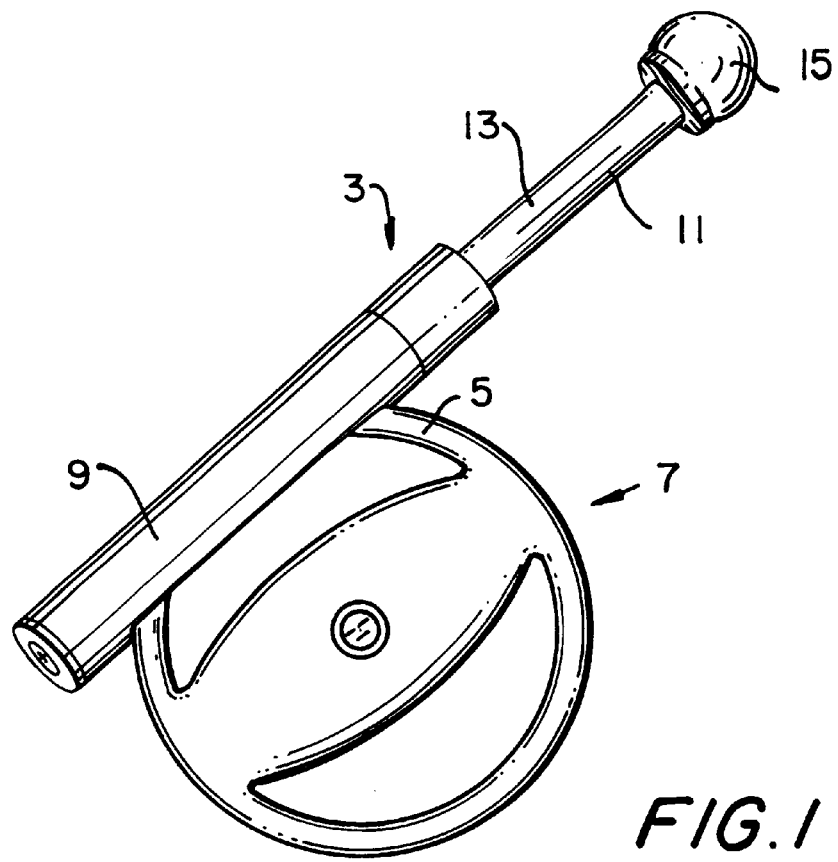
FIG. 1 shows the apparatus of the present invention attached to the steering wheel of a vehicle being secured against theft.

Referring to the FIG. 1, the locking device according to the invention is generally indicated at 3.

In the locking application, the device 3 is secured onto an arcuate portion 5 of a steering wheel assembly generally indicated at 7, which is an integral component of the vehicle being locked (not shown).

The locking device 3 comprises a body portion 9 which receives and is secured in engagement with the curved portion 5 of the steering wheel 7. An extension arm 11 projects from body portion 9, which arm 11 comprises shaft 13 and a handle end 15. This extension arm 11 is long enough so that rotation of the steering wheel without removing the locking device 32 is not possible because the extension arm 11 engages the body of the vehicle or the windshield, thereof, etc.

Figure 2:
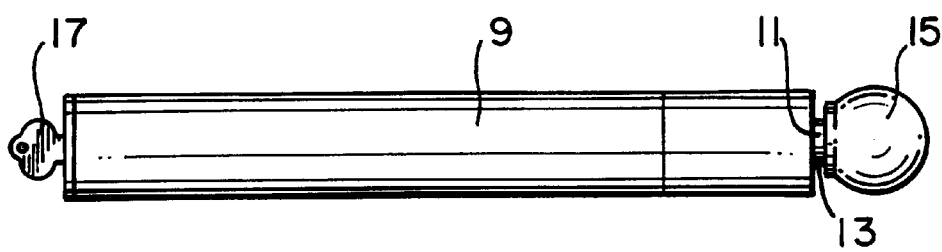
FIG. 2 shows a side view of the apparatus of the invention when not in use and collapsed for storage.

Referring to FIG. 2, when the locking device 3 is unlocked with a key 17, the device 3 can be removed from the steering wheel 7. The device 3 is then capable of being compactly stored, in that extension arm 11 is supported to slide shaft 13 into the interior of the body portion 9.

Figure 3:
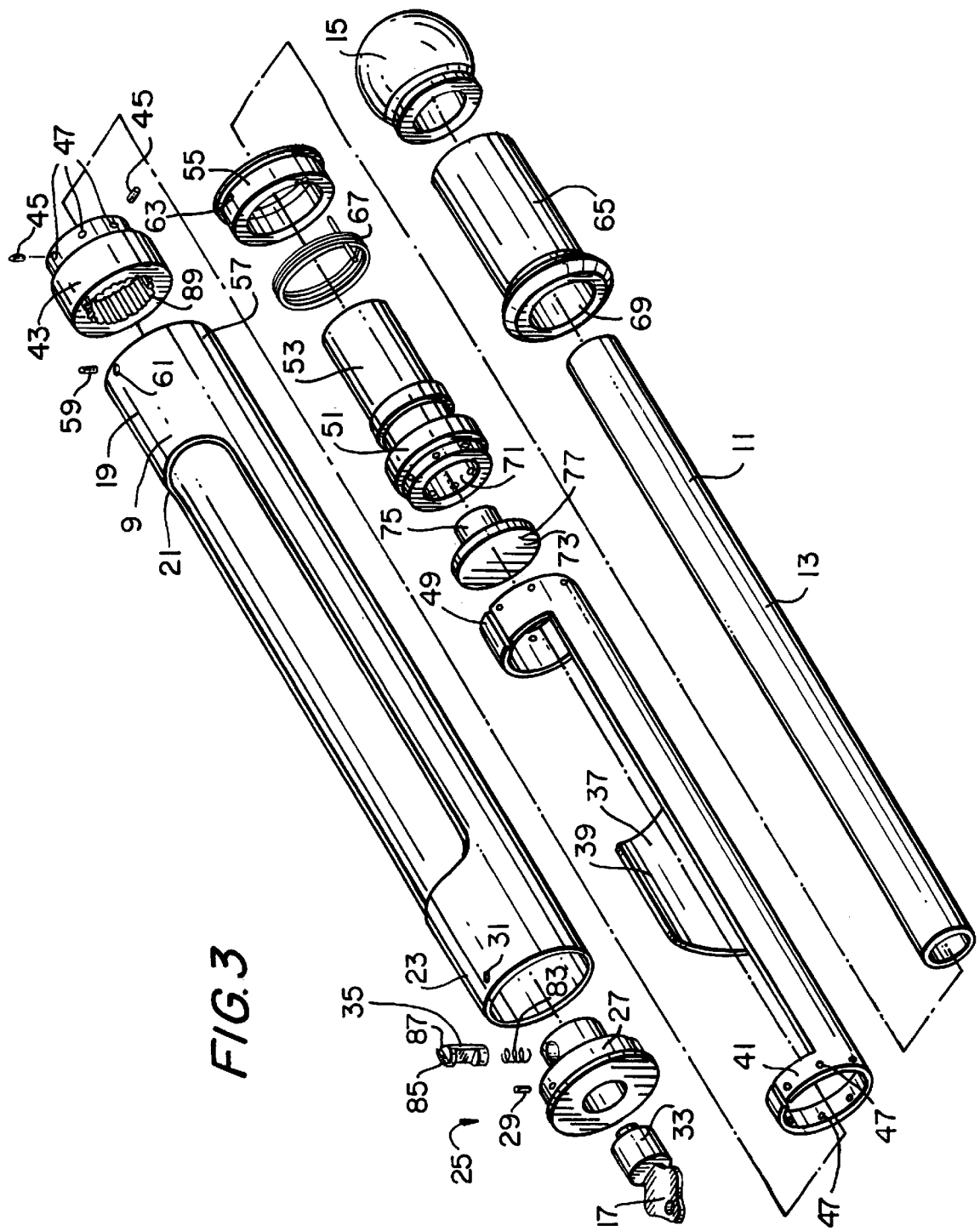
FIG. 3 shows an exploded perspective view of the locking device of the preferred embodiment.

Referring to FIG. 3, body portion 9 includes a cylindrical wall member 19 which extends longitudinally and has therein a longitudinal slot or recess 21 which is sized to receive the curved portion 5 of the steering wheel 7 in the interior of cylinder 19.

At one longitudinal end 23 of the cylinder 19, a lock structure generally indicated at 25 is provided. The lock structure 25 comprises a plug assembly 27 which is placed in the end opening 23 and secured therein by pin 29 extending through opening 31 in the end 23 of cylindrical member 19. Lock structure 25 is also includes a lock cylinder 33 which receives and operates with key 17 to lock and unlock the apparatus by interaction with locking element 35.

In order to secure the steering wheel 7 in the recess 21, an entrapment member 37 is provided. Entrapment member 37 includes a tongue 39 which extends circumferentially of the geometrically cylindrical structure of entrapment member 37. The entrapment member 37 is most preferably configured as a cut-out portion of a cylinder which is small enough to fit inside a cylindrical member 19. This is, however, not intended to mean that the manufacture of this component 19 is by cutting a cylindrical member, since it is clear that one of ordinary skill in the art could readily manufacture this part by many methods, e.g., cutting a sheet metal part and rolling the cutout into the necessary cylindrical shape.

Entrapment member 37 has a first end 41 which is fixedly secured to a lock engagement structure 43 by a plurality of pins 45 extending radially inward through apertures 47 in entrapment member 37 and in the lock engagement structure 43, fixedly connecting the two parts 43 and 37 together.

The other end 49 of entrapment member 37 is fixedly secured to extension member 51 in a similar fashion. Extension member 51 includes a cylindrical end segment 53 which extends through body portion end piece 55. Body portion end piece 55 is fixedly secured to the end 57 of cylindrical member 19 by pin 59 which extends through a hole 61 in the end 57 of cylindrical member 19 and into an opening 63 in the end portion 55.

The end portion 53 is received inside grip portion 65 which is secured thereto so that user can grasp grip portion 65 and rotate with it the extension part 53, entrapment member 37, and lock engagement structure 43.

A biasing spring 67 is provided inside cylinder 19 which provides a springing bias between the fixedly assembled parts attached to directly or indirectly to cylinder 19 and the inside part attached fixedly directly or indirectly to entrapment member 37.

Extension arm 11 comprises handle portion 15 which is fixedly mounted on one end of shaft 13. Shaft 13 extends through an internal cylindrical passage 71 in extension part 51 which is received in passage 69 in grip portion 65. Inside the cylindrical member 19 is a stop end structure 73 which comprises a connector part 75 secured in the end of shaft 13 and a flat head 77 which is too large to pull through passage 71 in extension part 53, but which is small enough to move freely within entrapment member 37, i.e. head 77 is smaller in radius than the radius of the cylindrical form of entrapment member 37. The presence of this head 77 prevents the complete withdrawal of the extension 13 from the apparatus, since it is entrained therein from passing through the part 51 which is rotatably held in end closure part 55.

The relative movement of all the parts is therefore provided so that the entrapment member 37 is free to rotate and tongue 39 can extend across recess 21 to entrap the curved portion 5 of the steering wheel therein. This is a lock position shown in FIG. 6, with the steering wheel 7 not shown.

When the steering wheel 7 is so entrapped, the shaft 11 of the of the extension arm 13 must be withdrawn to provide space for the curved portion 5 of the steering wheel 7. When locked to the steering wheel 7, therefore, the extension arm is fully extended, and any attempt to push it inward is prevented, because stop portion 77 engages the steering wheel 5.

The locking mechanism is best shown in FIG. 4. Key 17 is inserted into the cylindrical lock structure 33 which will only permit turning by the proper key, as is very well known in the art. Lock structure 33 includes an eccentrically placed engagement portion 79, which moves as structure 33 is rotated about center line A—A of the cylinder and engages contact surface 81 of lock element 35. Lock element 35 is biased by biasing spring 83 so that contact surface 81 engages protrusion 79 and is pressed against it continually.

Lock element 35 has a sloping engagement surface 85, as is best seen in FIG. 3, which surface slopes up to a sharp locking edge adjacent to radially extending locking wall 87. These surfaces 85 and 87 interact with a plurality of teeth 89 of a radially inwardly disposed concavity in engagement part 43. The teeth 89 extend radially inward of the lock engagement part 43 to a radial distance from the center line A—A generally indicated by phantom lines 91 (FIG. 4.)

When the key is properly turned to a locked position, protuberance 79 is rotated away from the spring 83, and the latching element 35 moves in an upward direction in FIG. 4 to extend in between the teeth 89. If entrapment member 37 is rotated in one direction, it rotates with it the lock engaging structure 43 and its teeth 89. The closest tooth 89 encounters the sloping surface 85 of lock element 35, and this cammingly pushes the locking element down against the urging of spring 83. The rotational movement continues until the tooth 89 passes over pass vertical edge of wall 87, at which point, the locking element 35 is biased to move back into the space between the passing tooth 89 and the next tooth 89. This can happen for several teeth in series, which constitutes a ratcheting action of the part 43 with the lock mechanism 25.

Moving in opposite direction, however, is not permitted by the lock element 35, since rotating the other way causes the teeth 89 to engage the flat surface 87. This does not allow for the camming interaction, prevents rotation, and keeps the wheel 7 locked in by the entrapping member 37 at the last position is has been moved to. Due to the number of teeth 89, a variety of thicknesses of steering wheel 7 can be snugly secured by the lock device 3 at varied lock positions.

For application of the lock device 3 to a wheel, the locking device 3 starts in a release state, wherein the entrapment member 37 is in a release position inside cylindrical wall 19 such that the tongue 39 is withdrawn from the opening recess 21. In this state, the steering wheel 7 can be inserted into this recess 21.

Moving from the folded storage position shown in FIG. 2, the shaft 13 is drawn out, clearing the interior space of the cylinder 19 in steering wheel 7. The key 17 is turned so that the eccentric protuberance 79 moves away from the spring 83, and element 35 is biased up into a ratcheting position between adjacent teeth 89.

The locking device 3 is placed over the steering wheel, and the user grasps grip portion 65 and turns it against the biasing of spring 67. This turns the extension portion 53, which in turn turns the entrapment member 37 so the tongue 39 moves across the recess 21 as seen in FIG. 6. This separates recess 21 into two openings, one on either side of tongue 39, and through which openings the arcuate portion 5 of the steering wheel 7 extends.

The ratcheting action of the locking element 35 allows incremental turning of the entrapment member 37 until the tongue extends across the recess 21 and secures the portion 5 of the steering wheel 7 therein so it cannot be removed. The steering wheel 7 is now secured by the attached locking device 3, and cannot be turned to steer the vehicle due to the restrictions on movement caused by the locking device 3.

To release the locking device 3, the user inserts and turns the key 17 into the cylinder 33, which causes the eccentric protuberance 79 to press down on element 35 to bring it to a release or unlock position shown in FIG. 4. In this position, the element 35 is radially inward of the teeth 89, and lock engagement structure 43 is free to rotate relative to the locking structure 27. The biasing force of spring 67, deformed during the rotation of the entrapment member 37 from the release position to the locked position, biases the entrapment member 51, entrapment member 37, and the lock engagement structure 43 to rotate back to the release position, withdrawing the tongue 39 from the recess 21. Steering wheel 7 can then be removed from the recess 21.

The terms used in the foregoing specification are intended as terms of description rather than of limitation, as those of skilled in the art with this specification before them will be able to make modifications and variations therein without departing from the spirit of the invention.

What is claimed is:

1. An apparatus for locking a steering wheel of a vehicle, said apparatus comprising:

a cylindrical body member with a cylindrical wall having a recess therein and a longitudinally extending opening in the cylindrical wall, said opening and said recess being configured to receive therein a portion of said steering wheel;

said cylindrical body member having a first end and a second end;

an entrapping member comprised of a cylinder section having first and second ends corresponding to said first and second ends of said cylindrical body member, said entrapping member rotatably supported on the body member and rotatable between a locked position wherein the entrapping member retains the portion of the steering wheel in said recess of the body member and a release position wherein the portion of the steering wheel can be withdrawn from the recess;

a locking system mounted on the first end of said body member and operatively associated with the entrapping member and selectively securing the entrapping member in said locked position so that the apparatus cannot be removed from the steering wheel;

said locking system being movable between a locked condition and a release condition, and in the release condition permitting movement of the entrapping member between the locked and release positions and in the locked condition retaining the entrapping member in the locked position;

said entrapping member having a cylindrical extension on said first end thereof, said cylindrical extension having an interior surface and a ratchet means, said ratchet means being actuated when the locking system is in the locked condition and when actuated permitting said entrapping member to be rotated incrementally in a locking direction but not in a releasing direction; and said ratchet means comprising a plurality of ratchet teeth operatively disposed on the interior surface of said cylindrical extension.

2. The apparatus of claim 1 wherein the locking system comprises a key lock acting on a pawl biased by a spring into engagement with said ratchet teeth.

3. The apparatus according to claim 2 wherein the entrapping member is movable between the lock and release positions by rotation about an axis which is the same as or parallel to the longitudinal axis of the cylindrical body member.

4. The apparatus according to claim 3 wherein the entrapping member is rotatable about the same axis as the longitudinal axis of the cylindrical locking member.

5. The apparatus according to claim 1 and further comprising an extension arm projecting from the body member longitudinally away from said recess so as to restrict rotation of the steering wheel by engaging the vehicle.

6. The apparatus according to claim 5 where the body member has an aperture therein communicating with the recess, and wherein the extension arm is slidably supported in said aperture to slide into and out of the recess, said arm being configured so that the arm is prevented from being slid into the recess when the steering wheel is secured in said recess.

7. The apparatus according to claim 1 wherein the entrapping member in the locked position extends generally laterally across the recess and defines on either side thereof a respective opening communicating with the recess configured such that the steering wheel can be received in said recess so to extend through both openings while retained in the recess.

8. The apparatus according to claim 1 and further comprising a spring means biasing the entrapping member to move into the release position so that the steering wheel is released when the locking structure is moved to the release condition.

* * * * *